United States Patent [19]

Wright

[11] 3,915,647

[45] Oct. 28, 1975

[54] DEVICE FOR DETERMINING THE CONCENTRATION OF A SUBSTANCE IN A FLUID

[75] Inventor: Richard F. Wright, Acton, Mass.

[73] Assignee: Polaroid Corporation, Cambridge, Mass.

[22] Filed: Aug. 16, 1974

[21] Appl. No.: 498,058

[52] U.S. Cl. ...... 23/253 TP; 23/230 B; 195/103.5 R
[51] Int. Cl.² .................. G01N 31/22; G01N 33/16
[58] Field of Search ........ 23/230 B, 253 TP, 230 R, 23/253 R, 259; 116/114 AM; 195/103.5 R, 127

[56] References Cited
UNITED STATES PATENTS

| | | |
|---|---|---|
| 2,429,694 | 10/1947 | King .................................. 23/232 R |
| 2,591,691 | 4/1952 | Forrester ........................... 23/232 R |
| 3,715,192 | 2/1973 | Wenz et al. ...................... 23/253 TP |
| 3,723,064 | 3/1973 | Liotta ............................. 23/253 TP X |

Primary Examiner—Robert M. Reese
Attorney, Agent, or Firm—Philip G. Kiely

[57] ABSTRACT

A diagnostic test device which includes a cavity adapted to receive a fluid containing a substance to be tested, reagents adapted to contact said fluid and react with said substance to form a second substance capable of providing a visual determination of the presence and/or concentration of said first substance. In a preferred embodiment, chromatographic methods are employed to provide visual indication of the second substance.

14 Claims, 5 Drawing Figures

DEVICE FOR DETERMINING THE CONCENTRATION OF A SUBSTANCE IN A FLUID

BACKGROUND OF THE INVENTION

A variety of devices are known today for analysis of body fluids such as urine, blood, etc. Such devices generally employ extremely accurate procedures and provide a valuable diagnostic tool. However, most such devices are expensive, require trained personnel and involve time-consuming techniques. Obviously, such devices are unavailable for use by a layman in, for example, daily monitoring of a diabetic condition.

To fill this very important need a number of relatively simple devices and test strips have been developed and marketed. Many of the so-called simple devices employed for use by untrained personnel suffer from a variety of deficiencies. Accuracy, the ability of the operator to discern relatively minor changes and ease of use are some of the problems encountered with such prior art devices.

It is an object of the present invention to provide techniques and devices not susceptible to the deficiencies of the prior art.

SUMMARY OF THE PRESENT INVENTION

The present invention is directed to a relatively simple diagnostic test device for use in analyzing a substance contained in a body fluid. The diagnostic test device of the present invention comprises a receptacle containing a cavity of predetermined dimensions adapted to receive a given volume of fluid, such as urine, containing the substance to be analyzed. The cavity includes an orifice, preferably constricted, which communicates with appropriate visual indication means for ascertaining the presence and/or concentration of the substance of interest in the fluid. Reagents adapted to provide the necessary reactions leading to the visual indication are disposed in the cavity or adjacent the orifice.

DETAILED DESCRIPTION OF THE INVENTION

Figure 1:
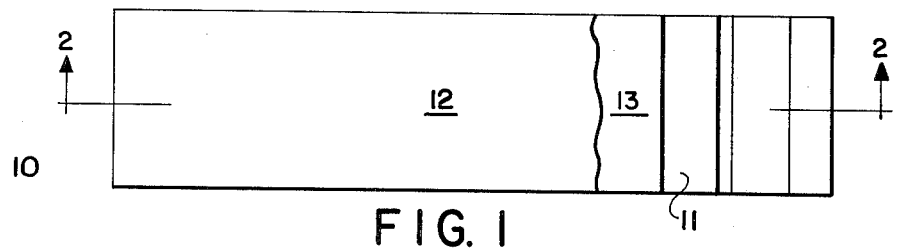
FIG. 1 is a top view of one embodiment of the device of the present invention.

The present invention is directed to a method and a device useful in said method for qualitative and/or quantitative determination of substances, particularly substances in body fluids. Thus, by means of the present invention, analysis of substances in blood, urine, etc., can be carried out quickly and easily without the need of trained personnel to provide an accurate measure of the substance under consideration in a body fluid.

One of the most serious drawbacks to simple diagnostic test devices is the difficulty in metering accurately the proper amount of fluid. Accuracy is required since very small amounts of substances are being analyzed for. The use by a layman of pipettes and the like is uneconomical and unwieldly with a high degree of inaccuracy possible. By means of the present invention, means for accurately providing the necessary amount of fluid are a component part of the device which requires substantially no skill to operate.

The device of the present invention comprises a fluid receiving cavity of predetermined volume with an egress of relatively small dimensions. The fluid is disposed in the cavity and the proper amount is present when the cavity is totally filled or filled to a mark. The reagents adapted to provide the colorimetric determination are preferably disposed in the cavity prior to the addition of the fluid. Reactions occur with the reagents and the substance under test providing a reaction product capable of measurement by visual determination. The aforementioned reaction product exits the constricted egress which preferably includes wicking means to hold back other materials from leaving the cavity. Upon leaving, the reaction product contacts visual indicator means whereby the quantity or presence of the substance can be ascertained by inspection.

In one embodiment, the visual determination is a colorimetric determination and is viewed through a transparent portion of one of the sheets and compared against a standard scale, either attached to the test device or separate therefrom. By matching the color produced in the test device with the scale, an accurate determination is readily available. The test device may then be discarded. Since a measured amount of fluid is contacted with a premeasured amount of reactants, a quantitative determination is achieved.

In an alternative embodiment, the visual determination is provided by a precipitation chromatograph. Thus the reaction products would diffuse into a chromatographic medium which contains a compound which forms an insoluble, colored compound upon contact with the reaction product produced from the substance. Since the colored material is insoluble and thus not diffusible, the only compound moving up the chromatographic medium would be the aforementioned reaction products. As the reaction product is converted to a nonreactable form, the colored wave front on the chromatographic medium is halted and the length of the colored zone is measured by an appropriate standard scale to provide a quantitative determination of the substance under test.

The fluid receiving cavity is preferably retained in a block of suitable material inert to the reactants, such as plastic, for example plexiglass. A cover sheet is preferably employed, both to avoid spillage and to ensure that sufficient fluid has been deposited in the cavity. For example, pH indicator means may be associated with the cover sheet to provide a visual indication if the cavity is full. Preferably, venting means are employed in the cover sheet to facilitate flow from the cavity.

The fluid receiving cavity is preferably relatively wide at one end to permit easy introduction of the fluid therein and relatively narrow at the other end to facilitate controlled diffusion of the reaction products therefrom. It will be obvious, therefore, that the cavity can assume a variety of shapes. The most efficient configurations are those with tapering walls, such as inverted cones or pyramids, or troughs.

In a particularly preferred embodiment, the constricted egress will include a passageway which may contain filters, wicks, reagents and the like. Preferably, the passage will contain reagents for producing the aforementioned reaction products and diffusion-controlling materials such as wicks or filters.

The port from the fluid-receiving cavity will communicate with the visual determination means. In a preferred embodiment, the visual determination means will be spaced apart from the exit port of the cavity to avoid capillary action and any inaccurate reading produced therefrom. It is also preferred that suitable means connecting the exit port with the visual determination means will be employed to facilitate flow thereto.

A second transparent cover sheet may be employed to protect the visual determination means from damage. A reference scale may be imprinted on the transparent cover sheet for comparison with the color generated by the reaction products.

To describe the operation of the test device in more detail, the operator will place the amount of fluid called for into the cavity by means, e.g., of an eye dropper. The cavity may be filled entirely or just to a predetermined mark. As stated above, for greater simplicity and accuracy the cavity is designed to hold the proper amount when filled.

After applying the fluid, the cover sheet is closed, the device shaken slightly to insure contact of the reagent and fluid, and no further action is required on the part of the operator except to compare the color generated with a standard scale to ascertain the quantity of the substance under test.

In the cavity, the substance under test in the fluid is reacting with the necessary reagents to provide the above-described reaction product. The thus-formed reaction product will diffuse through the constricted orifice contacting the colorimetric indicator means providing the visual determination of the substance.

As stated above, the reagents may either be introduced into the cavity by the operator prior to the addition of the fluid or may be disposed in the cavity in a stabilized and immobile state as part of the assembly process. In a preferred embodiment, the reagents are disposed in the wick material in the constricted orifice.

Figure 2:
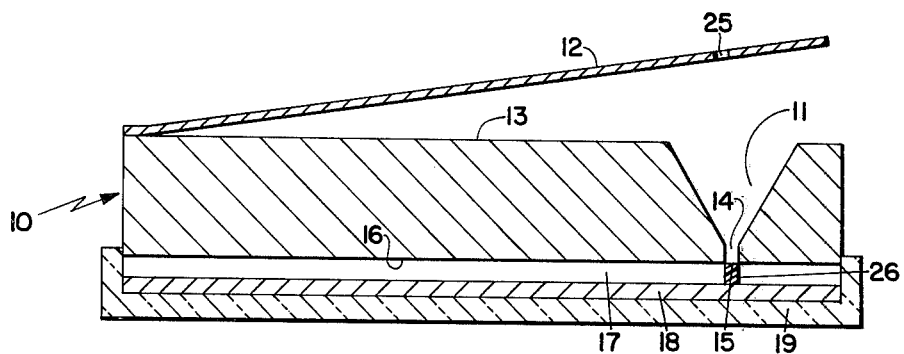
FIG. 2 is an enlarged cross-sectional view of the device of FIG. 1.

Turning now to the drawings, FIG. 1 is a top view of diagnostic test device 10, composed of a rectangular plastic block having cavity 11 in the configuration of a triangular trough transverse to device 10 and next adjacent one end of the device 10. Device 10 is shown in enlarged cross-section in FIG. 2 and includes cover sheet 12 with vent 25 therein, which is pivotally mounted on surface 13 and is adapted to close off cavity 11 after the fluid has been introduced therein. After the reaction of the substance in the fluid with the reagents contained in the cavity, the thus-formed reaction products will diffuse through passage 14 exiting cavity 11 through orifice 15. As stated above, to avoid capillary action, air space 17 substantially coextensive with the surface of device 10 is interposed at surface 16 and precipitation chromatographic sheet 18. Wick 26 carries said reaction product from orifice 15 to sheet 18. Transparent cover sheet 19 covers and protects sheet 18. The indicator color change in sheet 18 would provide a numerical determination of the concentration of the substance in the fluid. The further down sheet 18 (in the direction of the arrow) the color is developed, the greater the quantity of the substance in the fluid.

Figure 3:
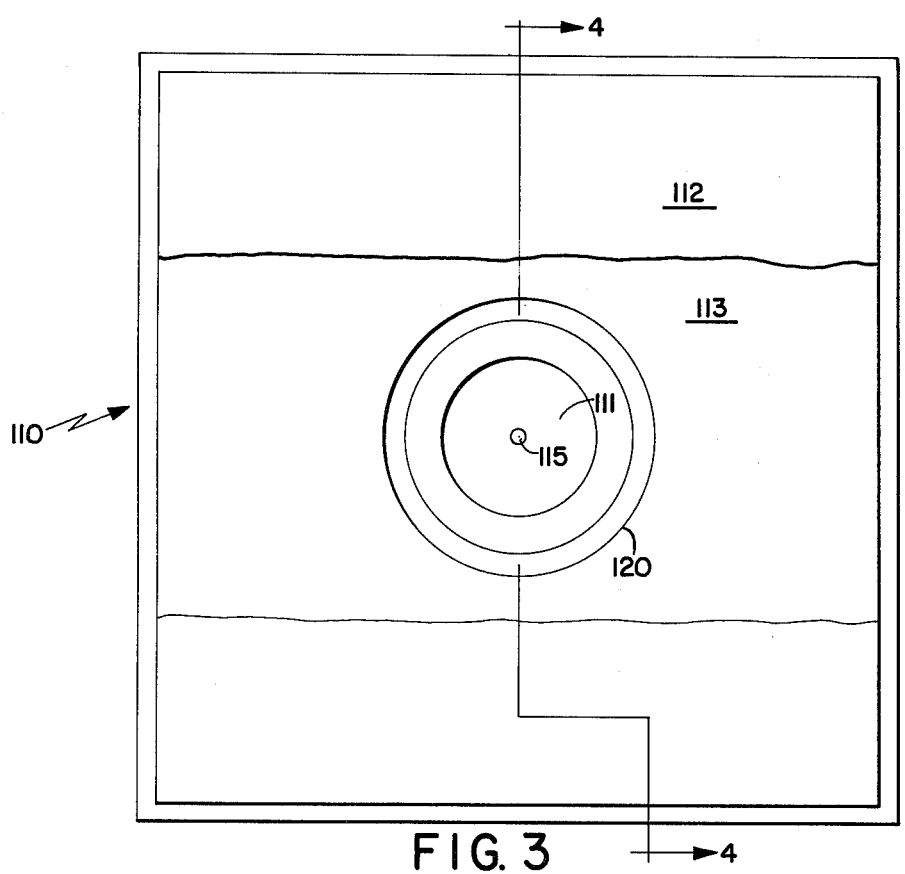
FIG. 3 is a top view of another embodiment of the device of the present invention.
Figure 4:
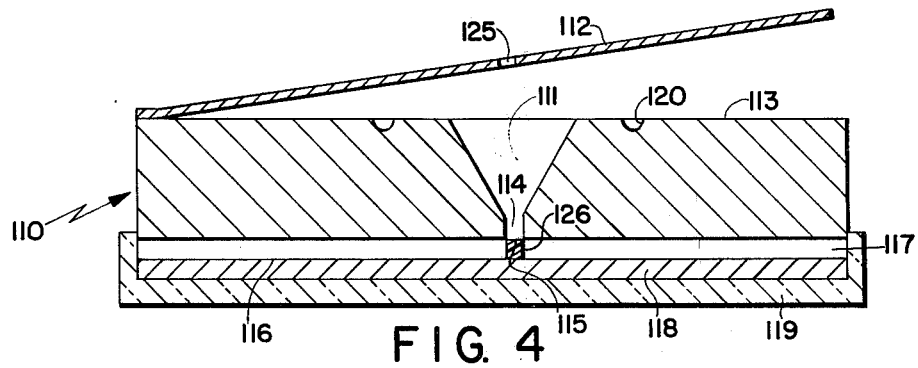
FIG. 4 is an enlarged cross-sectional view of the device of FIG. 3.
Figure 5:
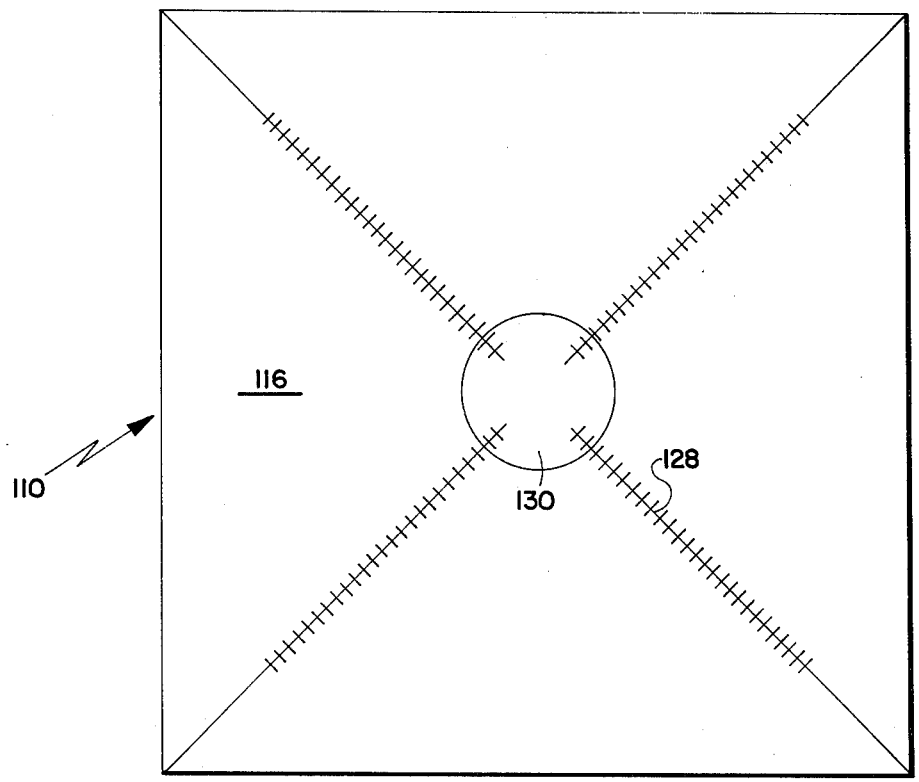
FIG. 5 is a bottom view of the device of FIG. 3 subsequent to processing.

An alternative test device 110 is shown in FIGS. 3, 4 and 5 wherein cavity 111 is in conical form and is disposed in substantially the center of a square block of plastic on surface 113 and which also includes passage 114 and orifice 115. In order to be certain the cavity 111 contains the proper amount of fluid, an excess is applied, which when cover sheet 112 with vent 125 is closed over cavity 111 will be squeezed into circular trough 120 which preferably contains a pH indicator or some other reagent which will provide a visual color change with the fluid. When the color change is indicated throughout the entire trough 120, cavity 111 will be filled. Surface 116 also contains, substantially coextensive therewith, in order, air space 117, precipitation chromatographic sheet 118 and transparent cover sheet 119 containing standard scale 128 thereon. Wicking means 126 communicates with orifice 115 and sheet 118. FIG. 5 shows the bottom side of device 110 subsequent to processing a fluid with shaded area 130 indicating the area of colored indicator which provides the visual determination of the concentration of the substance, which concentration can be readily ascertained by reference to scale 128.

It may be desirable to remove some components of the fluid prior to contacting the fluid with the reactants. Such components may be removed by superposing a filter over the cavity. Alternatively, precipitants may be employed in the cavity or passage leading from the cavity. Protein is one example of a component of the fluid that may be removed prior to the reaction.

The device may comprise any suitable material or materials which will retain the reactants without leakage or without interfering with the reaction.

As stated above, the novel device of the present invention may be employed for a variety of diagnostic tests. For example, hemoglobin in blood may be ascertained by introducing a blood sample to the cavity and disposing an oxidizing agent and a suitable indicator intermediate therein. Suitable indicators are known to the art for such a test.

The novel test device of the present invention is particularly suitable for the enzymatic analysis of glucose in body fluids. The test for glucose is based on the following reaction sequence:

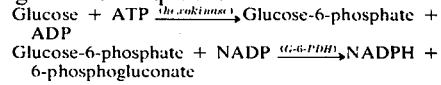

The absorption of NADPH at 340 nm is a measure of the glucose content in the sample fluid. Since 340 nm is beyond the visible region of the electromagnetic spectrum, a suitable indicator may be employed which will react with NADPH to provide an observable color change.

NADPH + 2,3',6-trichloroindophenol (oxidized form) → NADP + 2,3',6-trichloroindophenol (reduced form)

ATP = Adenosine triphosphate
ADP = Adenosine diphosphate
NADP = Nicotinamide adenine dinucleotide phosphate
NADPH = Nicotinamide adenine dinucleotide phosphate reduced
G-6-PDH = Glucose-6-phosphate dehydrogenase In operation, the body fluid containing the glucose would be introduced to the cavity. The reactants, ADP, NADP, and a colorimetric indicator, would be introduced to the cavity immediately prior to the fluid or initially disposed therein in an immobile state. Suitable indicators include methylene blue, the sodium salt of 3'-chloroindophenol, the sodium salt of 2,3'-trichloroindophenol and the sodium salt of 2,6-dichloroindophenol. In a preferred embodiment, precipitation chromatography was employed using the ferric complex of 4,7-diphenyl-1,10-phenanthroline to form an insoluble colored product upon reacting with NADPH. The color generated by the reaction will be compared visually with suitable color reference standards.

In a preferred embodiment, the ATP and NADP and enzymes would be disposed in the cavity. Alternatively, the ATP and NADP and enzymes may be disposed in the passage exiting the cavity, retained on a wick or other porous material which will delay passage of the reaction product. In a particularly preferred embodiment, the enzymes are in a stable, immobilized state which, upon contact with the fluid to be tested, is activated. The concentration of the NADH would be determined by the height or area of the color generated in the chromatographic sheet.

If the fluid to be analyzed contains a reducing substance (e.g., ascorbic acid in urine), it is preferred to employ a colorimetric indicator system that does not rely on a redox system to avoid any interference in the determination or inaccurate readings. For example, in a glucose determination, a suitable indicator system may comprise a ferric salt, such as ferric nitrate coated on silica gel. A ferric-NADH salt is formed which is purple. While the thus-formed colorimetric determination is suitable for the aforementioned glucose determination, if a permanent record of the test is desired than 1,10-phenanthroline or 4,7-diphenyl-1,10-phenanthroline also coated on the silica gel will provide a pink, permanent colorimetric indication.

It is also known to bind enzymes to polymeric matrices. For example, in a cross-linked dextrose gel, adjacent hydroxyl groups can react with cyanogen bromide and then combine with amino groups of the enzyme. Other systems for incorporating enzymes into the matrix of a polymer are also known.

In an alternative embodiment, a mordant for the colored moiety produced in the present invention is employed. This would provide a degree of immobility to the colored species rendering the visual comparison more effective and accurate and still further lessening time of examination as a factor. The use of a mordant would also minimize any reversible reaction which might lead to inaccuracy in the determination. Mordants are well known to the art for a variety of colored materials and the particular mordant will be selected with the particular colored material in mind.

As stated above, the novel device of the present invention is suitable for use in a variety of diagnostic tests. In the following table, representative substances to be analyzed are indicated with examples of specific enzymes required for the determination.

| Substance | Enzymes |
|---|---|
| Glucose | Hexokinase |
| | Glucose-6-phosphate dehydrogenase |
| Alcohol | Alcohol dehydrogenase |
| Triglycerides | Glycerol kinase |
| | Pyruvate kinase |
| | Lactate dehydrogenase |
| Blood urea nitrogen | Urease |
| | l-glutarate dehydrogenase |
| Aldolase | Triosephosphate isomerase |
| | (*GDH) Glyceraldehyde-3-phosphate dehydrogenase |
| Creatine phosphokinase | Hexokinase |
| | Glucose-6-phosphate dehydrogenase |
| Glutamate-oxalacetate transaminase | Malate dehydrogenase |

What is claimed is:

1. A device for determining the concentration of a substance in a fluid which comprises:
   a fluid receiving cavity;
   a colorimetric indicator system; and
   communicating means connecting said cavity with said colorimetric indicator system, said communicating means including a porous wick.

2. The device of claim 1 wherein said colorimetric indicator system comprises precipitation chromatography.

3. A device as defined in claim 1 which includes, disposed in said fluid receiving cavity, reagents adapted to react with said substance to provide a visual indication of the concentration of said substance.

4. The device of claim 3 wherein said reagents comprise enzymes, coenzymes and colorimetric indicators.

5. The device of claim 4 wherein said wick contains said reagents.

6. The device of claim 5 wherein said reagents comprise hexokinase, glucose-6-phosphate dehydrogenase, adenosine triphosphate and nicotinamide adenine dinucleotide phosphate.

7. A device for determining the concentration of a substance in a fluid which comprises a cavity adapted to receive said fluid; closure means for said cavity; cavity volume indicating means associated with said cavity, reagents disposed in said cavity adapted to react with said substance to provide a visual indication of the concentration of said substance; constricted passage means connecting said cavity and colorimetric indicator means where the visual indication of the concentration of the substance is adapted to be generated; a porous wick retained in said passageway and a transparent cover sheet overlying said colorimetric indicator means.

8. The device of claim 7 wherein said wick comprises a microporous filter.

9. The device of claim 7 wherein said colorimetric indicator means comprises a precipitation chromatographic sheet.

10. The device of claim 7 wherein said transparent sheet overlying said colorimetric indicator means includes a scale indicating concentration standards for said substance.

11. The device of claim 7 which includes means for removing undesirable components from said fluid prior to contacting said reagents with said fluid.

12. The device of claim 7 wherein said device includes time delay means to provide contact between said reagents and said substance in a predetermined time sequence.

13. The device of claim 7 wherein said reagents comprise enzymes, coenzymes and colorimetric indicators.

14. The device of claim 13 wherein said reactants comprise hexokinase and glucose-6-phosphate dehydrogenase, adenosine triphosphate and nicotinamide adenine dinucleotide phosphate.

* * * * *